Patented Jan. 15, 1946

2,393,133

UNITED STATES PATENT OFFICE 2,393,133

MANUFACTURE OF SYNTHETIC RUBBER LATICES

Leland M. White, Nutley, N. J., assignor to United States Rubber Company, New York, N. Y., a corporation of New Jersey No Drawing. Application January 27, 1944, Serial No. 519,943

12 Claims. (Cl. 260—23)

The present invention relates to improvements in the manufacture of synthetic rubber latices, and more particularly to obtaining a high yield of synthetic rubber latices which on drying will give a rubber having very low water-absorption characteristics. The invention also relates to electrical conductors having insulation thereon directly deposited from such latices and characterized by a low dielectric loss factor even after extended exposure to water.

Synthetic rubber latex, for example, Buna S latex, more recently called GRS latex, which is an aqueous dispersion of a copolymer of butadiene-1,3 and styrene, may be prepared in a known manner by the polymerization in the presence of a small amount of an oxidizing catalyst of an aqueous emulsion containing butadiene-1,3 and styrene and an emulsifying agent. Examples of oxidizing catalysts are alkali-metal perborates and persulfates, hydrogen peroxide, benzoyl peroxide. Generally a small amount of a regulator, such as an aliphatic mercaptan having from 6 to 18 carbon atoms in the molecule or an aromatic mercaptan, is added to the emulsion before polymerization to control the degree of polymerization (i. e., the average molecular weight of the polymer). Such an emulsion containing the butadiene-1,3 and styrene, emulsifying agent, catalyst and regulator, is heated in a closed chamber while agitating slowly to effect copolymerization of the butadiene-1,3 and styrene. The polymerization is not carried to completion since this would taken an excessive time and is found to give an inferior product. The polymerization is stopped short of completion, and unreacted butadene-1,3 monomer is vented off as a gas; a polymerization inhibitor, for example, sulfur or hydroquione, is added, and unreacted styrene monomer is removed as by steam distillation at ordinary or reduced pressure. An aqueous dispersion of a copolymer of butadiene-1,3 and styrene, or so-called synthetic rubber latex, results, which may be used as such in manufacturing processes, or a solid crude synthetic rubber may be recovered from the dispersion by conventional means, such as flocculation, washing, filtering and drying. The amount of emulsifying agent used in such emulsion-polymerization processes generally ranges up to about 5%, by weight based on the polymerizable materials in the emulsion. The conventional emulsifying agents that have been used to give high yields of copolymers of butadiene-1,3 and styrene are alkali-metal soaps. Commercial surface-active agents such as alkali-metal alkyl naphthalene sulfonates, other aromatic sulfonates, sulfonated alcohols, salts of amines of 8 or more carbon atoms, and polyethylene oxide have been suggested as emulsifying agents. Such emulsifying agents are unsatisfactory where a synthetic rubber latex is desired that on drying will give a synthetic rubber having low water-absorption characteristics, as in the preparation of films or foils and in the direct insulation of wire, because the retention in the dried rubber deposit of water-absorbing or water-soluble residues from such emulsifying agents gives the rubber high water-absorption characteristics. Ammonium soaps, which would leave no water-absorbing or water-soluble residue in the dried deposit of a rubber dispersion, have been used as dispersing agents in the early work in emulsion-polymerization of butadiene. Amminimum soaps are unsatisfactory as emulsifying agents in the emulsion-polymerization, as with mixtures of butadiene-1,3 and styrene, because the rate of polymerization is so low, as compared with that obtained by the use of alkali-metal soaps, as to make the process impractical. For example, in commercial practice, around 75% conversion can be obtained in 12 hours in the emulsion polymerization of 75 parts butadiene-1,3 and 25 parts styrene mixtures using an alkali-metal soap as the emulsifying agent, whereas less than 50% conversion is obtained in 24 hours using an ammonium soap as the emulsifying agent.

By the present invention, a method has been devised whereby high yields of emulsion-polymerizate of mixtures of butadiene-1,3 and styrene may be obtained that are comparable with the yields obtained with alkali-metal soaps as emulsifying agents, but with the advantage of a resultant aqueous dispersion of the butadiene-styrene copolymer that on drying will give a product having very low water-absorption characteristics, and which may be treated similarly to natural rubber latex to give a directly deposited electrical insulation having a di-electric loss factor comparable to that obtained with purified natural rubber latex.

According to the present invention, the polymerization of an aqueous emulsion of a mixture of butadiene-1,3 and styrene is carried out in the presence, as the sole emulsifying agent, of a soap of a soap-forming monocarboxylic acid having 12 to 20 carbon atoms and a volatile alkyl mono-amine having a boiling point below 160° C. at atmospheric pressure and having an ionic dissociation constant equal to at least $1 \times 10^{-4}$ and containing in one molecule of the amine not more than 6 carbon atoms. The conventional oxidizing catalyst and regulator may be present as above described. The soap-forming acid of the emulsifying agent may be any of the conventional soap-forming acids, such as oleic, lauric, myristic, palmitic, stearic or abietic acids. The amine for forming the soap may be a primary, secondary, or tertiary mono-amine, provided it has the defined characteristics as above set forth. Examples of such amines that may be used as the base in forming the soap are methylamine, ethylamine, dimethylamine, diethylamine, triethylamine, propylamine, dipropylamine, isopropylamine, di-isopropylamine, butyl primary amines, amyl primary amines, hexyl primary amines, cyclohexylamine, piperidine, 1-methylpiperidine, 2-pipecoline, 3-pipecoline, 4-pipecoline, and such mixed amines as methyl ethylamine, methyl propylamine, methyl butylamine, and methyl diethylamine. Alkyl monoamines other than those having the characteristics above described are not satisfactory, those having a normal boiling point at 160° C. or above, leaving water-absorptive or water-soluble residues in the dried deposit of the emulsion polymerizate and those having ionic dissociation constants below $1 \times 10^{-4}$ or having more than 6 carbon atoms in one molecule of the amine giving unsatisfactory low yields of polymer. Trimethylamine, which has a dissociation constant of $7 \times 10^{-5}$, is unsatisfactory in that it gives a poor yield of polymerizate. Ammonia, which also gives an unsatisfactory yield, has a dissociation constant of $1.8 \times 10^{-5}$. Tripropylamine is unsatisfactory because of its high boiling point of over 200° C. Other amines which are excluded by the specific requirements of the soap-making amine as above defined are ethanolamine, diethanolamine, triethanolamine, and morpholine, all of which have an ionic dissociation constant of less than $1 \times 10^{-4}$ and/or are too high boiling.

The emulsion polymerization of the mixture of butadiene-1,3 and styrene is carried out in the presence of the amine soap used as an emulsifying agent according to the present invention in the usual manner of agitating and heating for the time necessary to effect the desired conversion. Usually 12 hours in a closed chamber at 50° C. are the optimum conditions for polymerization. With the amine soaps according to the present invention a satisfactory conversion comparable to that obtained with alkali-metal soaps is obtained under these conditions. The relative proportions of butadiene-1,3 and styrene may be varied and are generally within the range of 75 parts by weight of butadiene and 25 parts of styrene, to 25 parts of butadiene and 75 parts of styrene. The amount of butadiene and styrene in the emulsion is generally 100 parts by weight of butadiene and styrene per 100 to 200 parts of water.

After the polymerization has been carried to the desired extent, the unreacted butadiene-1,3 and styrene monomers are removed. The butadiene-1,3 may be removed by venting the closed chamber at atmospheric pressure whereby the low-boiling butadiene-1,3 escapes as a gas. The styrene may be removed by steam distillation at reduced or atmospheric pressure. The polymerization inhibitor is added before or after the removal of the butadiene-1,3 but in any case it should be added prior to the removal of the styrene. I have found that, because of the volatility of the amine in the amine soaps used according to the present invention, a large amount of the amine may be removed along with the unreacted butadiene-1,3 and styrene monomers. Generally, unless the amine is very low boiling, the amount of amine removed with the venting of the butadiene-1,3 will be insufficient to so destabilize the copolymer dispersion as to effect flocculation or coagulation. However, it is necessary to add some volatile base to the emulsion before or during the removal of the styrene, enough being added to keep the pH of the emulsion at a value above 9.0. This prevents flocculation or coagulation of the emulsion polymerizate. Any volatile base having a boiling point below 160° C. at atmospheric pressure may be added to maintain the pH of the latex. Such base may be any of the same alkyl amines that may be used as the soap-forming amines according to the present invention or, if desired, it may be any volatile base having a boiling point below 160° C., including ammonia and amines such as trimethylamine which are excluded from the soap-forming amines used in the present invention by virtue of their having an ionic dissociation constant less than $1 \times 10^{-4}$.

An aqueous dispersion of a copolymer of butadiene-1,3 and styrene as thus prepared will, on drying, give a rubber having very low water-absorption characteristics. A dried thin film prepared from such a dispersion remains transparent under humid conditions, whereas films made by drying a dispersion of a similar butadiene-styrene copolymer but prepared with an alkali metal soap as a dispersing agent, though fairly clear when dried, become cloudy and translucent upon exposure to a humid atmosphere. The aqueous dispersion of the butadiene-styrene copolymer made according to the present invention may, if desired, be coagulated by the usual procedures of flocculating, washing, filtering and drying to produce a crude synthetic rubber having low water-absorption characteristics. The dispersion of the butadiene-1,3 and styrene copolymer may, as is desirable in the case of the manufacture of electrical insulation, be purified and concentrated by centrifuging or creaming, as by the addition of a small amount, for example, 0.1 to 0.3 part, of a hydrophilic colloidal creaming agent, such as ammonium alginate or other vegetable mucilage, or synthetic colloidal creaming agent, such as hemicelluloses, per 100 parts of water of the dispersion, and centrifuging, or allowing the thus treated dispersion to stand until creaming takes place. The polymer-rich or cream fraction may be used in the direct insulation of electrical conductors. In making insulated wire, the thus purified and concentrated dispersion may be compounded in the usual way, for example, with a suitable vulcanizing agent, vulcanizing accelerator, activator, and antioxidant, the addition of water-soluble non-volatile substances being avoided in such compounding. An insulation of the desired thickness may be formed by repeatedly passing the electrical conductor through a bath of the thus compounded dispersion, drying each coating before application of the next, and finally vulcanizing the insulation. In this manner electrical conductors have been made having electrical resistance characteristics comparable to those obtained by similar manufacture of electrical conductors from creamed or purified natural rubber latex.

The present preferred embodiment of amine soap as an emulsifying agent according to the present invention is a dimethylamine soap of a long chain aliphatic carboxylic acid, for example, dimethylamine oleate. In the use of dimethylamine as the soap-forming base, as distinguished from the other amines that may be used according to the present invention, I have found that the proportion of dimethylamine to soap-forming acid must be accurately controlled so that the molar ratio of dimethylamine to soap-forming acid does not exceed a value of 1.05 and preferably does not exceed a value of 1.0. With the other amines, according to the present invention, the proportion of amine to soap-forming acid is not similarly critical and excess of amine over that necessary for theoretical saponification of the soapforming acid may be used even to a molar ratio of amine to soap-forming acid as high as 1.5. The regulation of the molar ratio of dimethylamine to soap-forming acid in the preparation of dimethylamine soap so that it does not exceed a value of 1.05, constitutes a departure from the common practice followed in making up amine soap solutions. The usual method of making amine soaps is to add an aqueous solution of the amine to the soap-forming acid until a clear solution is obtained, in which case the molar ratio of amine to soap-forming acid is generally as much as 1.10 to 1.25. For most purposes such excess amine over the theoretical amount necessary for saponification of the soap-forming acid is unimportant, but in the use of dimethylamine soaps as emulsifying agents in the emulsion polymers of mixtures of butadiene-1,3 and styrene, I have found that such excess of dimethylamine over the amount necessary for theoretical saponification results, for reasons not understood by me, in a retarding of the polymerization reaction and a consequent low conversion during the period in which a high conversion would otherwise be expected according to the present invention. I have found, however, that if the molar ratio of dimethylamine to soap-forming acid does not exceed a value of 1.05, then a high conversion will take place in the polymerization reaction.

The following illustrates the preparation of an aqueous dispersion of a copolymer of butadiene-1,3 and styrene according to the present invention, and the direct utilization of the same in the manufacture of electrical conductors. All parts reported are by weight.

45 parts of butadiene-1,3 and 55 parts of styrene having dissolved therein 0.25 part of a conventional regulator which is a mixture of aliphatic mercaptans, mostly decyl, dodecyl and tetra-decyl mercaptans, were emulsified in an aqueous solution containing 0.3 part of potassium persulfate, and 5 parts of dimethylamine oleate prepared by mixing equimolar proportions of dimethylamine in water solution and oleic acid, and 150 parts of water. This aqueous emulsion was gently agitated to maintain the emulsion and heated at 50° C. in a closed vessel to copolymerize the butadiene-1,3 and styrene. After 12 hours' heating, the vessel was vented to reduce the pressure to atmospheric pressure and remove gaseous unreacted butadiene-1,3 monomer. 0.3 part of hydroquinone was then added to the aqueous dispersion of the copolymer of butadiene-1,3 and styrene in order to stop polymerization. The emulsion was steam distilled to remove unreacted styrene monomer, and during removal of the styrene the pH of the dispersion was kept at 9.0 or above by the intermittent addition of dimethylamine. If desired, sufficient volatile base may be added at one time before removal of the styrene to maintain the pH at 9.0 or above throughout the removal of the styrene. It is understood that any volatile base which has a boiling point below 160° C. at atmospheric pressure may be added to keep the pH of the emulsion at a value above 9.0. The volatile base may be all added prior to the removal of the butadiene-1,3 provided sufficient is added to maintain the pH of the emulsion above 9.0 during the subsequent removal of the butadiene-1,3 and styrene.

The dispersion of the copolymer of butadiene-1,3 and styrene thus formed was once-creamed by adding water to a concentration of 25% solids, and 0.25 part of ammonium alginate per 100 parts of water, then allowing the dispersion to stand for 24 hours, and separating the polymer-rich creamed fraction from the polymer-poor subnatant serum fraction. The thus treated dispersion had a solids content of copolymer of about 40%.

The creamed copolymer dispersion was compounded by adding thereto 2 parts by weight of sulfur, 3 parts zinc oxide, 1.5 parts mercaptothiazole type accelerator, and .5 part antioxidant per 250 parts of dispersion (containing 100 parts copolymer solids). From the dispersion of copolymer of butadiene-1,3 and styrene compounded as above, a film was built up on an electrical conductor by repeatedly passing the wire through a bath of the compounded dispersion, each coating of the dispersion being air dried at 100° C. before application of the next. The final dried film, which was about 0.055" thick, was vulcanized 10 to 20 minutes in air at 145° C. The insulation on the conductor as thus produced had a dielectric loss factor of 8 to 12%. The dielectric loss factor is the product of the dielectric constant (specific inductive capacity) and the power factor. This loss factor did not change beyond the limits of 8 to 12% after soaking in water at 70° C. for 14 days. Wire insulated with thrice-purified commercial Hevea latex compounded similarly to the above has a similar loss factor of 8 to 12% dry, and also after similar soaking in water for 14 days. Dispersions of copolymers of butadiene and styrene prepared by the usual alkali metal soaps exhibit loss factors of 30 to 50% or more after only 3 days in water at 70° C. and failed by the end of 7 days' soaking.

While the use of the emulsifying agents of the present invention has been described above with reference to the manufacture of aqueous dispersions of copolymers of butadiene-1,3 and styrene, they may be similarly used in the aqueous emulsion polymerization of other polymerizable material, for the preparation of other well known types of synthetic rubber latices. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3. The polymerizable material as known may be a mixture of such butadienes-1,3 with other polymerizable compounds which are capable of forming copolymers with butadienes-1,3, for example, compounds which contain a

group where at least one of the disconnected valences is attached to an electro-active group, that is, a group which substantially increases the electrical dissymetry or polar character of the molecule. Examples of compounds which contain a

group and are copolymerizable with butadienes-1,3 are aryl olefins, such as styrene and vinyl naphthalene, the alpha-methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the polymerization of an aqueous emulsion of a mixture of butadiene-1,3 and styrene, the step of carrying out the polymerization in the presence, as an emulsifying agent, of a soap of a soap-forming monocarboxylic acid having 12 to 20 carbon atoms and a volatile alkyl monoamine having a boiling point below 160° C. at atmospheric pressure and having an ionic dissociation constant equal to at least $1 \times 10^{-4}$, and containing in one molecule of the amine not more than 6 carbon atoms.

2. The method which comprises subjecting to polymerization an aqueous emulsion containing butadiene-1,3 and styrene and a soap of a soap-forming monocarboxylic acid having 12 to 20 carbon atoms and a volatile alkyl mono-amine having a boiling point below 160° C. at atmospheric pressure and having an ionic dissociation constant equal to at least $1 \times 10^{-4}$, and containing in one molecule of the amine not more than 6 carbon atoms.

3. The method which comprises subjecting to polymerization an aqueous emulsion containing butadiene-1,3 and styrene and a soap of a soap-forming monocarboxylic acid having 12 to 20 carbon atoms and a volatile alkyl mono-amine having a boiling point below 160° C. at atmospheric pressure and having an ionic dissociation constant equal to at least $1 \times 10^{-4}$, and containing in one molecule of the amine not more than 6 carbon atoms, stopping the polymerization short of completion, removing unreacted butadiene-1,3 and styrene monomers, and, after stopping of the polymerization and before complete removal of the unreacted butadiene-1,3 and styrene monomers, adding a volatile base having a boiling point below 160° C. at atmospheric pressure whereby to keep the pH of the emulsion at a value above 9.0.

4. The method which comprises subjecting to polymerization an aqueous emulsion containing butadiene-1,3 and styrene and a dimethylamine soap of a soap-forming monocarboxylic acid having 12 to 20 carbon atoms.

5. The method which comprises subjecting to polymerization an aqueous emulsion containing butadiene-1,3 and styrene and a dimethylamine soap of a soap-forming monocarboxylic acid having 12 to 20 carbon atoms, the molar ratio of dimethylamine to acid in the soap not exceeding a value of 1.05.

6. The method which comprises subjecting to polymerization an aqueous emulsion containing butadiene-1,3 and styrene and a dimethylamine soap of a soap-forming monocarboxylic acid having 12 to 20 carbon atoms, stopping the polymerization short of completion, removing unreacted butadiene-1,3 and styrene monomers, and, after stopping of the polymerization and before complete removal of the unreacted butadiene-1,3 and styrene monomers, adding a volatile base having a boiling point below 160° C. at atmospheric pressure whereby to keep the pH of the emulsion at a value above 9.0.

7. The method which comprises subjecting to polymerization an aqueous emulsion containing butadiene-1,3 and styrene and a dimethylamine soap of a soap-forming mono-carboxylic acid having 12 to 20 carbon atoms, the molar ratio of dimethylamine to acid in the soap not exceeding a value of 1.05, stopping the polymerization short of completion, removing unreacted butadiene-1,3 and styrene monomers, and, after stopping of the polymerization and before complete removal of the unreacted butadiene-1,3 and styrene monomers, adding a volatile base having a boiling point below 160° C. at atmospheric pressure whereby to keep the pH of the emulsion at a value above 9.0.

8. The method which comprises subjecting to polymerization an aqueous emulsion containing butadiene-1,3 and styrene and dimethylamine oleate, stopping the polymerization short of completion, removing unreacted butadiene-1,3 and styrene monomers, and, after stopping of the polymerization and before complete removal of the unreacted butadiene-1,3 and styrene monomers, adding a volatile base having a boiling point below 160° C. at atmospheric pressure whereby to keep the pH of the emulsion at a value above 9.0.

9. The method which comprises subjecting to polymerization an aqueous emulsion containing butadiene-1,3 and styrene and dimethylamine oleate in which the molar ratio of dimethylamine to oleic acid does not exceed a value of 1.05.

10. The method which comprises subjecting to polymerization an aqueous emulsion containing butadiene-1,3 and styrene and dimethylamine oleate in which the molar ratio of dimethylamine to oleic acid does not exceed a value of 1.05, stopping the polymerization short of completion, removing unreacted butadiene-1,3 and styrene monomers, and, after stopping of the polymerization and before complete removal of the unreacted butadiene-1,3 and styrene monomers, adding a volatile base having a boiling point below 160° C. at atmospheric pressure whereby to keep the pH of the emulsion at a value above 9.0.

11. In the polymerization of an aqueous emulsion of material selected from the group consisting of butadienes-1,3 and mixtures of butadienes-1,3 with other polymerizable compounds capable of forming copolymers with butadienes-1,3, the step of carrying out the polymerization in the presence, as an emulsifying agent, of a soap of a soapforming monocarboxylic acid having 12 to 20 carbon atoms and a volatile alkyl mono-amine having a boiling point below 160° C. at atmospheric pressure and having an ionic dissociation constant equal to at least $1 \times 10^{-4}$, and containing in one molecule of the amine not more than 6 carbon atoms.

12. The method which comprises subjecting to polymerization an aqueous emulsion containing a butadiene-1,3 and a compound which contains a

group and is copolymerizable with butadienes-1,3, and a soap of a soap-forming monocarboxylic acid having 12 to 20 carbon atoms and a volatile alkyl mono-amine having a boiling point below 160° C. at atmospheric pressure and having an ionic dissociation constant equal to at least $1 \times 10^{-4}$, and containing in one molecule of the amine not more than 6 carbon atoms.

LELAND M. WHITE.